United States Patent [19]

Christenson

[11] 4,119,511

[45] Oct. 10, 1978

[54] APPARATUS AND METHOD OF ASSISTING PILE DRIVING BY ELECTRO-OSMOSIS

[76] Inventor: Lowell B. Christenson, 7410 Thurow, Houston, Tex. 77087

[21] Appl. No.: 761,737

[22] Filed: Jan. 24, 1977

[51] Int. Cl.² ............................................. B01D 13/02
[52] U.S. Cl. ................................ 204/180 R; 405/232; 405/228; 166/248; 175/19; 204/299 R
[58] Field of Search ........................... 204/180 R, 299; 61/53.5, 36; 175/19; 166/248

[56] References Cited

U.S. PATENT DOCUMENTS

| 1,327,268 | 1/1920 | Christians | 61/36 R |
| 2,435,345 | 2/1948 | Freyssinet | 61/53.5 |
| 3,137,140 | 6/1964 | Müller | 61/53.5 |
| 3,766,741 | 10/1973 | Hartzell | 61/53.5 |
| 4,028,900 | 6/1977 | Müller | 175/19 X |
| 4,046,657 | 9/1977 | Abbott | 204/180 R |

OTHER PUBLICATIONS

Nikolaev, "Pile Driving by Electroosmosis", Consultants Bureau, New York (1962).

Primary Examiner—Arthur C. Prescott
Attorney, Agent, or Firm—Fulbright & Jaworski

[57] ABSTRACT

An apparatus and method of assisting the driving of a pile into soil containing water by electro-osmosis in which electrical direct current is directed through the soil for reducing friction between the pile and the soil allowing the pile to be more easily driven through the soil. An electrically conductive base is connected to the bottom of the pile and an insulated electrical conductor is connected between the d-c power source and the conductive base. A second electrical conductor is connected to the power source and terminates at a position spaced from but in electrical communication through the soil with the base whereby passage of electrical current between the base and the second electrical conductor reduces friction between the pile and the soil. If the pile is electrically conductive, the conductive base is electrically insulated from the pile in order to direct current through the soil adjacent the base. The second electrical conductor may be connected to the pile if the pile is conductive or in the soil or in water covering the soil. After the pile has been driven, the electrical current may be directed through the soil adjacent the pile to dry the soil thereby increasing the load bearing strength of the soil.

10 Claims, 9 Drawing Figures

U.S. Patent  Oct. 10, 1978  Sheet 1 of 2  4,119,511
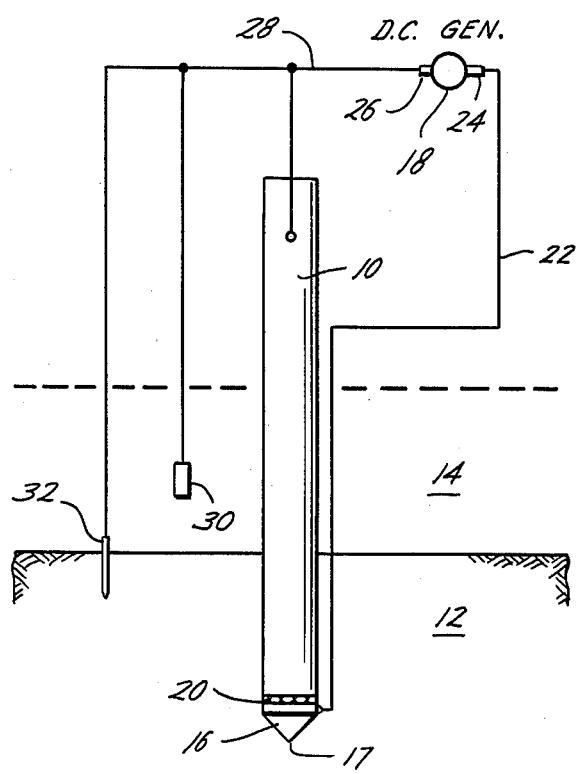
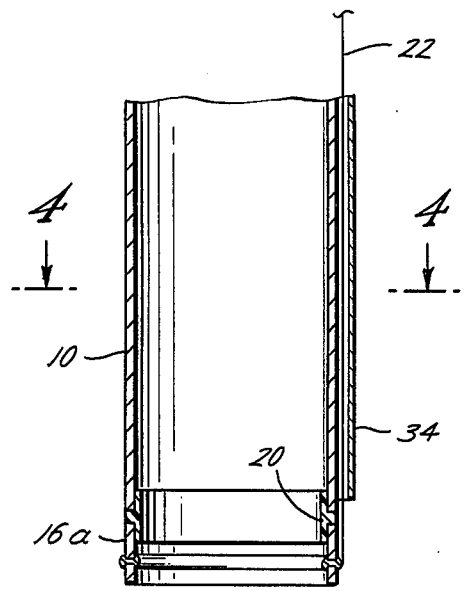
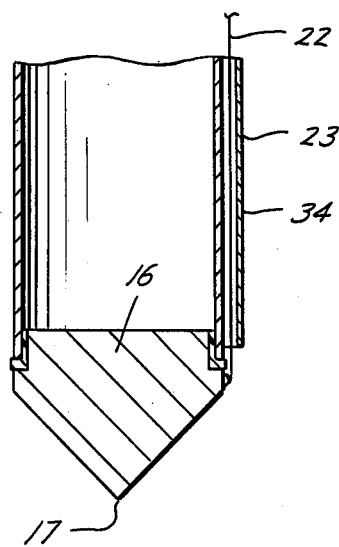
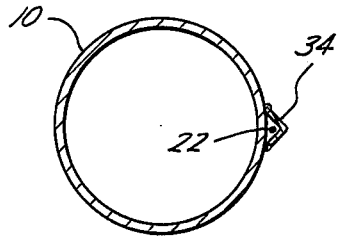

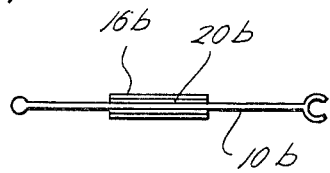
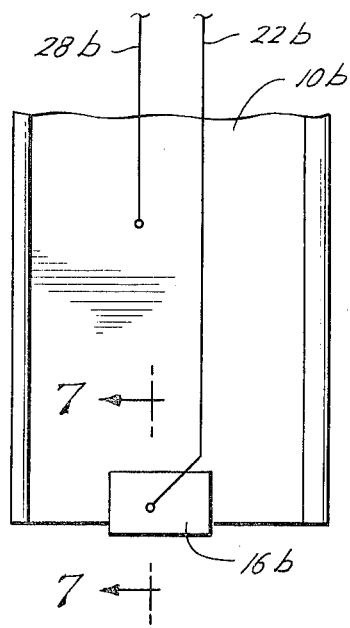
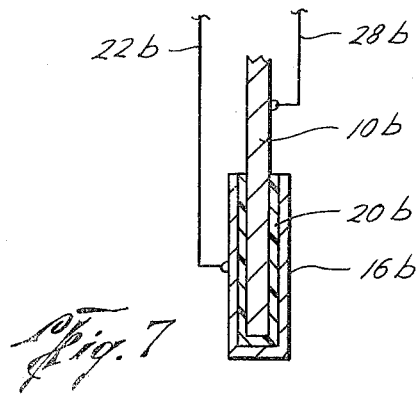
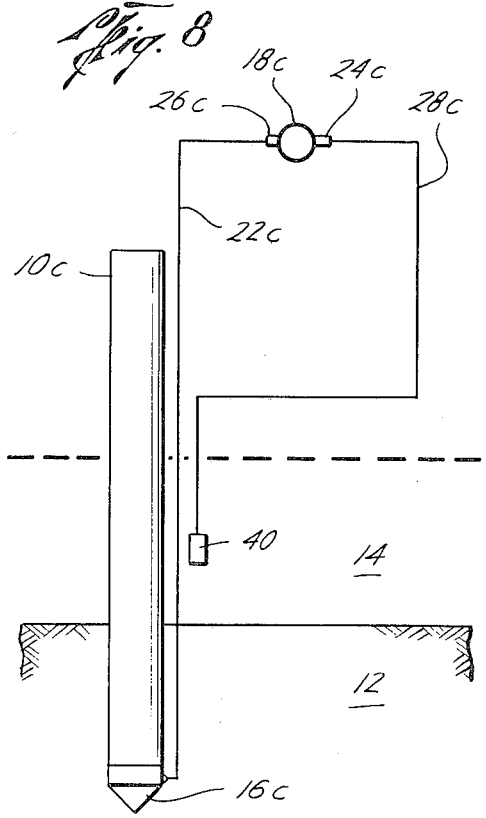
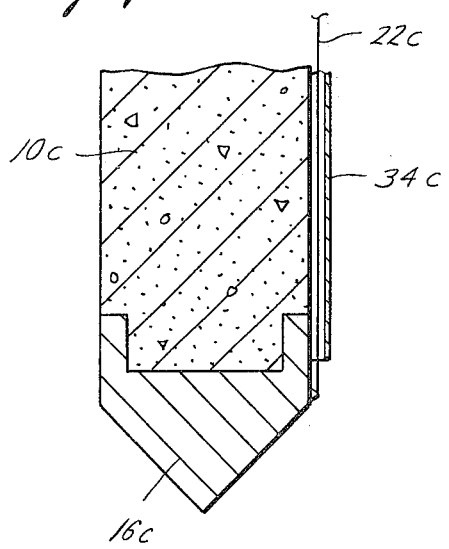

APPARATUS AND METHOD OF ASSISTING PILE DRIVING BY ELECTRO-OSMOSIS

BACKGROUND OF THE INVENTION

The principle of electro-osmosis is used in the field of soil mechanics to describe the effect of water moving through a non-granular soil from an anode to a cathode upon the application of a direct current power source. Electro-osmosis also has been utilized to assist pile driving as described in copending application Ser. No. 683,564, By Phillip A. Abbott and as described in the following prior art papers:

1. Pile Driving by Electroosmosis, by B. A. Nikolaev, Consultants Bureau, 1962;
2. Stresses in a Saturated Soil Mass During Electro-Osmosis, by W. S. Wang; and
3. The Influence of a Direct Current Potential on the Adhesision Between Clay and Metal Objects. Laboratory and full Scale Tests, by Ir. H.K.S. ph. Begemann.

The present invention is directed to an improved method and apparatus for assisting pile driving by electroosmosis to insure that electrical current is conducted to the bottom of the pile to move water through the soil adjacent to where the pile is being driven whereby the pile can be more easily driven.

The present invention is directed to an improved method and apparatus for assisting pile driving by electroosmosis by attaching a conductive base to the bottom of the pile and connecting the base by an insulated electrical conductor to a d-c power source so as to direct electrical current through the soil adjacent the bottom of the pile to move water through the soil adjacent the pile whereby the pile may be more easily driven.

SUMMARY

A further object of the present invention is to provide a method and apparatus to insure that electrical current, even in the presence of water, is directed between the bottom of the pile and along the pile to a position above the bottom of the pile for reducing friction between the pile and the soil.

Yet a further object of the present invention is the provision of an apparatus and method for assisting the driving of a pile into soil which contains water by attaching an electrically conductive base to the bottom of the pile, connecting an insulated electrical connector between a d-c power source and the conductive base, and connecting a second electrical conductor between the d-c power source and a position spaced from and above but in electrical communication, through the soil, with the conductive base whereby friction between the pile and the soil is reduced. In the event that the pile is an electrically non-conductive pile, the insulated electrical conductor is connected between the negative output of the d-c power source and the conductive base and the second electrical conductor is connected to an anode positioned in water above the soil whereby the water moves down the outer edge of the pile and reduces friction between the pile and the soil. In the case of an electrically conductive pile, the electrically conductive base is electrically insulated from the pile and the second electrical conductor may be connected to either the conductive pile, the soil, or in water covering the soil. In this case, the insulated electrical conductor is connected to the positive of a d-c power source and the second electrical conductor is connected to the negative of the power source.

Still a further object of the present invention is the provision of controlling the direction of current flow after the pile has been driven for reducing the water content of the soil adjacent the pile and increasing the load bearing strength of the soil.

Other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

FIG. 1 is an elevational and schematic view of the apparatus of the present invention as used with a pile which is being driven into the soil below a body of water, FIG. 2 is an enlarged fragmentary cross-sectional view of the bottom of the pile of FIG. 1, FIG. 3 is a fragmentary cross section of an elevational schematic view of another embodiment in which a differently shaped base is utilized, FIG. 4 is a cross-sectional view taken along the line 4—4 of FIG. 3, FIG. 5 is a cross-sectional view of a sheet pile to which the present invention is connected for assisting in driving, FIG. 6 is a fragmentary elevational view of the structure of FIG. 5, FIG. 7 is an enlarged cross-sectional view taken along the line 7—7 of FIG. 6, FIG. 8 is an elevational and schematic view of the present invention as applied to an electrically non-conductive pile being driven into the soil below a body of water, and FIG. 9 is an enlarged fragmentary cross-sectional view of the lower end of the pile of FIG. 8.

DESCRIPTION OF THE PREFERRED EMBODIMENT

The present invention will be described in FIG. 1 in conjunction with driving a pile 10 into the soil 12 which may be below a surface of water 14 such as an ocean. The pile 10 is being driven by any suitable type of pile driver (not shown) such as illustrated in patent application Ser. No. 683,564.

The present invention is applicable to assisting in the driving of various types of conductive or non-conductive piles such as concrete, plastic, wooden or steel pile, which may have various types of cross-sectional shapes such as pipe piles, H-piles, sheet piles and square piles as well as hollow or solid piles. The pile 10 illustrated in FIG. 1 is typically a hollow steel pipe pile. When the pile 10 is driven into the soil 12, which has any significant clay content, soil is encountered having a minimum of moisture content, and it becomes increasingly difficult to drive the pile 10 because of the adhesion and the shear strength of the soil 12 on the outside of the pile 10. The present invention utilizes the principle of electro-osmosis by providing an electrical current path which will move water along the sides of the pile 10 to decrease the strength of the soil 12 whereby the pile 10 may be more easily driven.

Referring now to FIGS. 1 and 2, the pile 10 is shown in position in contact with and being driven into the soil 12. The present invention includes an electrically conductive base 16, here shown as a conically shaped base, connected to the bottom of the pile 10. A d-c power source 18 is provided above the water 14 for providing direct current to cause the water in the soil to flow along the sides of the pile 10. Since the pile 10, as shown in FIG. 1, is an electrically conductive pile, the base 16 is electrically insulated from the pile 10, such as by an insulator 20, which may be of any suitable connection such as an epoxy connection. An insulated conductor 22 is connected to the positive terminal 24 of the direct current generator 18 and passes downwardly through the water 14, preferably on the outside of the pile 10 through a protective shield 34 (FIG. 2) and has its second end electrically connected to the base 16. The negative terminal 26 of the generator 18 may be connected by a second conductor 28, which need not be insulated, preferably to the pile 10, although alternatively, the conductor 28 may be connected to a cathode 30 positioned in the water 14 or to a cathode 32 positioned in the soil 12. The base 16 acts as an anode 16 thereby causing water to migrate from the anode 16 towards a cathode connected to the negative connection to the generator 18. With direct current applied between the anode 16 and one of the cathodes 10, 30 and 32, water in the soil 12 will rise upwardly from the base 16 around the outside of the pile 10 as the pile is driven into the soil 12. Preferably, the negative conductor 28 is connected to the pile 10 and in this case the moisture in the soil 12 is attracted to the body of the pile 10 and friction is reduced between the pile 10 and the soil 12 because (1) the increased moisture around the sides of the pile 10 decreases the soil shear strength, (2) formation of hydrogen bubbles by the passage of the electrical current increases the soil pore pressure and thus decreases soil shear strength, and (3) there is electrical repulsion between the electrical negative pile 10 and the naturally negative clay particles in the soil 12.

While the soil 12 near the bottom or tip 17 of the base 16 dries out as the moisture therein is moved upwardly along the sides of the pile 10 and the friction of the tip 17 relative to the soil 12 is increased, since the surface area of the bottom 17 is very small compared with the surface area of the exterior of the pile 10, there is an overall net reduction in total friction between the pile 10 and the soil 12. The drying at the bottom 17 of the base 16 is not significant as long as the pile 10 is kept in motion and is not allowed to remain in one position for a long time. When the pile 10 has reached the desired depth of penetration, the electrical current of the same polarity is continued without further driving the pile 10 and in that event the soil 12 adjacent the base 16 is dried to provide support for the pile 10. Thereafter, the generator 18 is turned off and the moist layer of soil adjacent to the pile 10 will dry out and reach equilibrium with the surrounding soil due to natural causes. It is to be noted that since the conductor 22 is insulated there will be no electrical communication between the conductor 22 and either the cathodes 10, 30 or 32 even though the conductor 22 passes through electrically conductive water 14 and soil 12 and therefore electrical current is directed along the sides of pipe 10 from the anode base 17.

Referring now to FIGS. 3 and 4, a further embodiment is shown in which the parts corresponding to those in FIG. 1 are identical and similarly numbered with the exception that the base 16a is a tubular shoe instead of a solid cone thereby allowing electrical current to flow from the anode base 16a up through the inside of the pile 10 as well as the outside of the pile 10 thereby decreasing the friction between the inside of the pile 10 as well as the outside of the pile 10 and the soil 12. It is to be further noted that the insulated conductor 22 may be encased in a protective shield 34 such as an angle iron welded to the exterior of the piling 10 thereby protecting the conductor 22 as the pile 10 is driven into the soil 12.

While the pile 10 in FIGS. 1–4 has been indicated as pipe piles, the present invention is applicable to piles of various shapes, cross sections and materials. Referring now to FIGS. 5, 6 and 7, a further embodiment of the invention is shown in which corresponding parts are correspondingly numbered to those in FIG. 1 with the addition of a suffix "b". In FIGS. 5, 6 and 7, the pile being driven is a conventional sheet pile 10b. The base 16b may be a U-shaped member connected to the bottom of the pile 10b and since the pile 10b is electrically conductive, the base 16b is electrically insulated from the pile 10b by any suitable electrical insulation 20b. Again, the positive electrical insulated conductor 22 is connected to positive terminal of a generator (not shown) and preferably a second conductor 28b is connected to the pile 10b and the negative terminal of a d-c generator (not shown). The operation and result of the embodiment shown in FIGS. 5, 6 and 7, are similar to those shown in FIGS. 1–4.

Referring now to FIGS. 8 and 9, the use of the present invention in assisting in the driving of a non-conductive pile is best seen. Parts corresponding to those in FIGS. 1–4 are similarly numbered with the addition of the suffix "c". Thus the pile 10c which is non-conductive, such as concrete, wood or plastic, is driven into the soil 12 through the water 14. A conductive base 16c is connected to the bottom of the pile 10c. Since the pile 10c is non-conductive, there is no need to insulate the conductive base 16c from the pile 10c. An insulated first conductor 22c is connected between the base 16c and the negative terminal 26c of the generator 18c. A second conductor 28c which need not be insulated is connected to an anode 40 which is positioned in the water 14. With the generator 18c applying voltage, current will flow from the anode 40 through the water 14 down along the outside edge of the pile 10c to follow the shortest electrical path to the base 16c moving water along the outside edges of the pile 10c. In this case, water is attracted to the base 16c and will tend to follow the path of least resistance which will be along the previously wetted and disturbed soil adjacent to the outside of the pile 10c. Where there is natural water 14 above the soil 12, the tendency will be for the water to flow down along the outside of the body of the pile 10c to the base 16c. If there is no natural water available, a small depression is made in the soil 12 about the outside of the pile 10c and water is added to provide an ample supply of moisture to move along the exterior surface of the pile 10c and reduce the shear strength of the soil adjacent the pile 10c. After the pile 10c is driven to its proper depth, the polarity of the generator 18c is reversed to dry out the soil about the base 16c permanently. After shutting off the generator 18c, the soil around the driven pile 10c will reach equilibrium moisture condition with the surrounding soil 12.

The present invention, therefore, is well adapted to carry out the objects and attain the ends and advantages mentioned as well as others inherent therein. While presently preferred embodiments of the invention are given for the purpose of disclosure, numerous changes in the details of construction, arrangement of parts, and the steps of the process will readily suggest themselves to those skilled in the art and which are encompassed within the spirit of the invention and the scope of the appended claims.

What is claimed is:

1. An apparatus for assisting the driving of a pile into soil having a body of water above the soil surface comprising,
    an electrically conductive base connected to the bottom of the pile,
    a d-c power source,
    an insulated electrical conductor connected between the negative output of the power source and the conductive base,
    a second electrical conductor connected to the positive output of the power source and positioned in the water and in electrical communication through the soil with the base for moving the water downwardly along the outside of the pile whereby friction between the pile and soil is reduced making the pile easier to drive through the soil.

2. The apparatus of claim 1 wherein the pile is hollow and the base includes a vertical opening therethrough for exposing both the inside and the outside of the pile to the water in the soil.

3. The apparatus of claim 1 wherein the base is conically shaped with the tip of the cone directed downwardly.

4. An apparatus for assisting the driving of an electrically conductive pile into soil containing water comprising,
    an electrically conductive base connected to the bottom of the pile but electrically insulated from the conductive pile,
    a d-c power source,
    an insulated electrical conductor connected between the positive output of the power source and the conductive base, and
    a second electrical conductor connected to the negative output of the power source and terminating at a position spaced from but in electrical communication through the soil with the base whereby friction between the pile and the soil is reduced.

5. The apparatus of claim 4 wherein the second electrical conductor termination is connected to the pile.

6. An apparatus for assisting the driving of an electrically non-conductive pile into soil having a body of water about the pile and above the soil surface comprising,
    an electrically conductive base connected to the bottom of the pile,
    a d-c power source,
    an insulated electrical conductor connected between the negative output of the power source and the conductive base,
    an anode positioned in the water, and
    a second electrical conductor connected between the anode and the positive output of the power source for moving the water downwardly along the outside of the pile towards the base whereby friction between the pile and soil is reduced.

7. A method of assisting the driving of a pile into soil containing water comprising,
    attaching an electrically conductive base to the bottom of the pile,
    connecting an insulated electrical conductor between a d-c power source and the conductive base, and
    connecting a second electrical conductor between the d-c power source and at a position spaced from but in electrical communication through the soil with the conductive base whereby friction between the pile and soil is reduced.

8. A method of assisting the driving of an electrically conductive pile into the soil containing water comprising,
    attaching an electrically conductive base to the bottom of the pile but electrically insulating the base from the pile,
    connecting an insulated electrical conductor between the positive output of a d-c power source and the conductive base,
    connecting a second electrical conductor between the negative output of the power source and at a position spaced from but in electrical communication with the conductive base through the soil whereby friction between the pile and soil is reduced.

9. The method of claim 8 wherein the second electrical conductor is connected between the power source and the electrically conductive pile.

10. A method of assisting the driving of an electrically non-conductive pile into soil covered by water comprising,
    attaching an electrically conductive base to the bottom of the pile,
    connecting an insulative electrical conductor between the negative output of a d-c power source and the conductive base,
    connecting a second electrical conductor between the positive output of the power source and an anode, and placing the anode in the water whereby the friction between the pile and soil is reduced.

* * * * *